United States Patent [19]

Kenigsberg et al.

[11] 3,988,074
[45] Oct. 26, 1976

[54] ANHEDRAL BIFILAR

[75] Inventors: Irwin Jeffrey Kenigsberg, Trumbull; Edward Sterling Carter, Fairfield, both of Conn.

[73] Assignee: United Technologies Corporation, Hartford, Conn.

[22] Filed: Nov. 13, 1975

[21] Appl. No.: 631,577

[52] U.S. Cl. .............................. 416/145; 416/500
[51] Int. Cl.² ............................................ B64C 27/32
[58] Field of Search .......... 416/144, 145, 500, 61; 74/523, 574, 575

[56] References Cited
UNITED STATES PATENTS

| | | | |
|---|---|---|---|
| 2,519,762 | 8/1950 | Hoffmann et al. | 416/500 X |
| 3,372,758 | 3/1968 | Jenney | 416/145 |
| 3,540,809 | 11/1970 | Paul et al. | 416/144 X |
| 3,874,818 | 4/1975 | Saunders et al. | 416/144 |
| 3,887,296 | 6/1975 | Mills et al. | 416/145 |
| 3,910,720 | 10/1975 | Vincent et al. | 416/145 |
| 3,932,060 | 1/1976 | Vincent et al. | 416/145 |

OTHER PUBLICATIONS
B576,158, Mar. 1976, Eastman et al., 416/145.

*Primary Examiner*—Everette A. Powell, Jr.
*Attorney, Agent, or Firm*—Maurice B. Tasker; Vernon F. Hauschild

[57] ABSTRACT

A multibladed helicopter rotor carries at least three bifilar absorbers which are tuned to eliminate in-plane vibrations of the rotor that otherwise would be transmitted to the helicopter fuselage. By drooping the radial support arms for the absorbers out of the plane normal to their axis of rotation, the resultant of the centrifugal forces acting on the pendulous elements of the absorbers and the weight of these elements acts normal to the axes of the tuning pins of the absorbers which minimizes internal frictional damping in the absorbers.

15 Claims, 6 Drawing Figures

ANHEDRAL BIFILAR

The invention herein described was made in the course of or under a contract or subcontract thereunder, with the Department of the Army.

CROSS-REFERENCES TO RELATED APPLICATIONS

In a copending application of I. Kenigsberg & W. Paul, Ser. No. 633,886, filed Nov. 20, 1975, and assigned to the assignee of this application, a bifilar absorber is shown which is related to the present application to the extent that the improvements disclosed in these two applications can be used together in the same basic bifilar absorber installation.

BACKGROUND OF THE INVENTION

1. Field of the Invention

This invention relates to helicopters in which in-plane vibrations of the rotor are transmitted to the helicopter fuselage, resulting in undesirable levels of vibration in the pilot and passenger compartments. More particularly this invention relates to improvements in bifilar absorbers carried by the helicopter rotor for rotation therewith.

2. Description of the Prior Art

U.S. Pat. No. 3,540,809, issued Nov. 17, 1970 to W. F. Paul et al, shows a helicopter equipped with bifilar absorbers. In the Paul et al patent the bifilar absorbers have a pendulous, or counterweight, element at the end of an arm projecting from the rotor hub in a plane normal to the axis of rotation of the rotor. The counterweight of each absorber is connected to its supporting arm by tuning pins which pass through enlarged apertures in the supporting arm and the counterweight of the absorber. These provide a rolling pendulous and vibration absorbing motion between the counterweight and its supporting arm. In a bifilar absorber excessive internal friction between the counterweight and its supporting structure can completely destroy absorber efficiency and, to prevent frictional face-to-face contact between the sides of the counterweight and the adjacent surfaces of its supporting arm, tapered washers are provided in the Paul et al patent between these confronting faces in an effort to reduce internal frictional damping. While these washers proved helpful, there remained too much frictional damping for satisfactory comfort of occupants of the helicopter.

SUMMARY OF THE INVENTION

The principal object of this invention is to provide improved bifilar absorbers to eliminate the in-plane vibrations set up in a helicopter rotor before they can be transmitted to the fuselage, thereby eliminating problems of pilot performance, passenger comfort and the threat to structural integrity which such vibrations create.

In accordance with the present invention at least three improved bifilar absorbers are rotated with the helicopter rotor to cancel rotor in-plane vibrations. The amplification factor of the bifilar absorbers is maintained high by avoiding face-to-face contact between the relatively movable elements of the absorbers. This is accomplished by fabricating the radial absorber supporting arm with a calculated downward inclination, or droop, the amount of this droop being such that the resultant of centrifugal forces acting on the pendulous element of the absorber and the weight of this element is normal to the inclined tuning pins of the absorber. In this way the resultant force is reacted entirely by the rolling tuning pins of the absorber and the previous troublesome internal friction is eliminated.

A further object of this invention is generally to improve the construction and operation of bifilar absorbers used on helicopter rotors.

Figure 5:
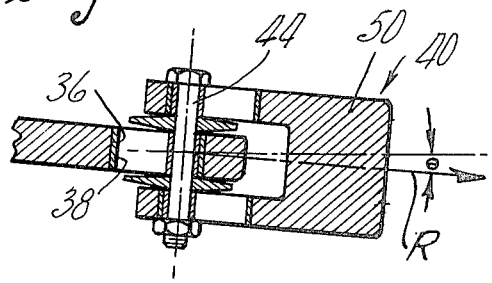
Figure 6:
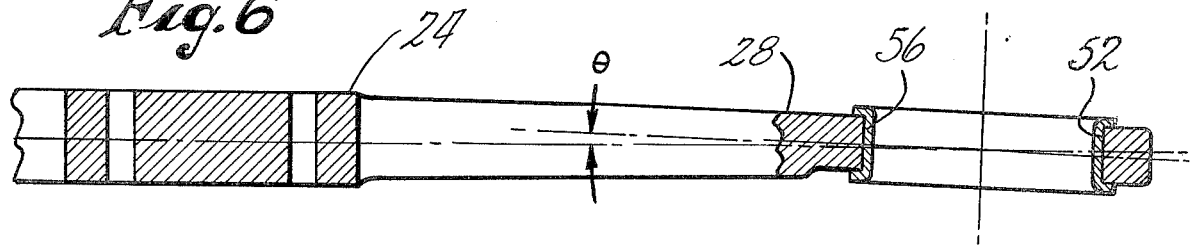
FIG. 6 is a detail of the deflected absorber support member, parts being broken away.

The angle of deflection is very small and hence has not been shown except in FIGS. 5 and 6.

DESCRIPTION OF THE PREFERRED EMBODIMENT

Figure 1:
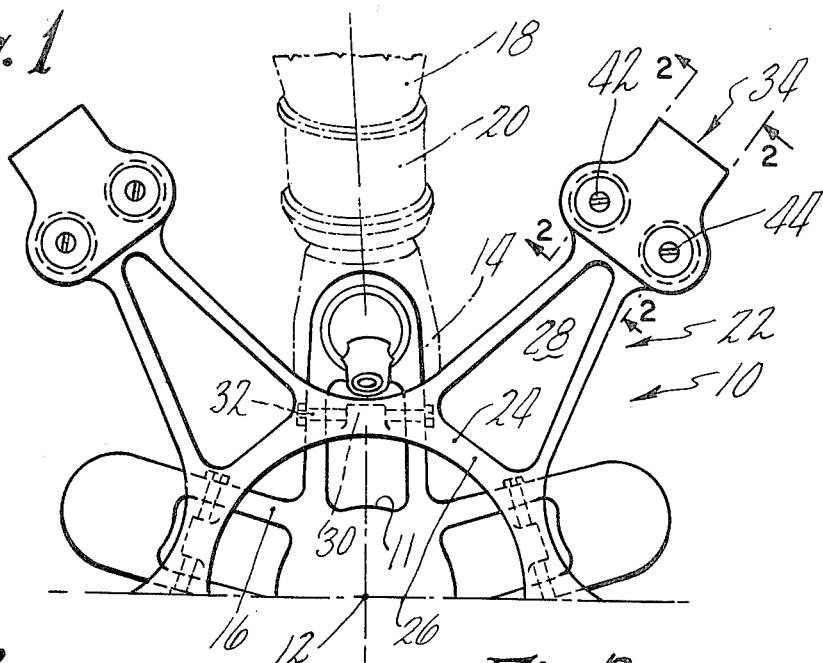
FIG. 1 is a partial plan view of a prior art helicopter rotor utilizing bifilar vibration absorbers.

FIG. 1 shows a portion of a helicopter rotor 10 which is mounted atop a drive shaft 11 for rotation about axis 12. The rotor includes central part, or hub, 14 which includes a number of radially projecting arms, or plate members, 16 to which rotor blades 18 are attached through a sleeve and spindle assembly 20.

Vibration absorber units 22 are mounted for rotation with rotor 10, being connected to hub 14. Each unit 22 includes support member 24 which has a central ring 26 concentrically positioned relative to axis 12 with star points, or arms, 28 projecting radially therefrom and equally spaced circumferentially about ring 26. Lugs 30 project downward from ring 26 of support member 24 and are bolted directly to plate member 16 by bolts 32. It will be evident, then, that support member 24 for vibration absorber units 22 is mounted for rotation with hub 14.

A bifilar vibration absorber of our improved construction is positioned at the outer end of each of the star points 28 of support member 24. It will be noted that ring 26 of support member 24 which supports the absorbers lies in a plane normal to axis 12. Star points 28 of support member 24, however, in accordance with this invention are deflected slightly downward out of the plane of ring 26 as will be hereinafter explained more fully. The angle of deflection is very small and hence has not been shown except in FIGS. 5 and 6.

Figure 2:
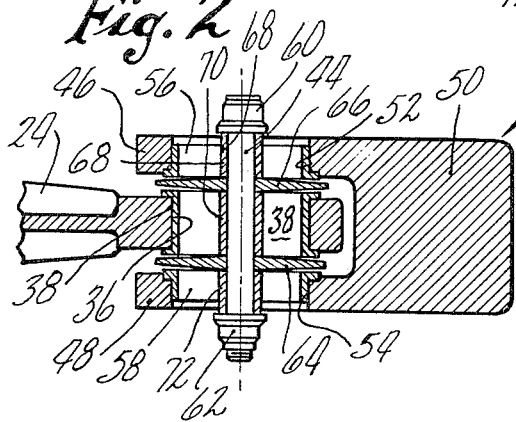
FIG. 2 is a sectional view along either of lines 2—2 of FIG. 1.

FIG. 2 is a section taken on either of the two lines 2—2 of FIG. 1. It should be noted that the absorbers 34 will not be in the FIG. 2 position during operation. FIG. 2 has been taken for ease of explanation because it shows very clearly the construction of the absorbers 34. The radially projecting star points 28 of support member 24 has substantially circular apertures 36 therein and may have bushings 38 therewithin. There are two such bushed apertures in each star point projection 28 since the pendulous or weighted element 40 is connected to and supported from support member 24 by two roll pins 42,44. Roll pin 44 only is shown in FIG. 2, but it should be borne in mind that roll pin 42 is identical thereto and connected to support member 24 in the same manner so that FIG. 2 actually represents a showing through either section line 2—2 of FIG. 1.

Pendulous element 40 is U-shaped in cross section and includes two side plates 46,48 which are joined by weight portion 50 with one side plate member on the top and the other on the bottom of support member 24. Side plates 46,48 have substantially circular apertures 52,54 therein and these are substantially the same diameter as apertures 36. These apertures may include tracking bushings 56,58 and 38 respectively. Roll pin 44 extends through apertures 52,54 in side arms 46,48 and through aperture 36 in star point 28 of support member 24 and serves to connect the pendulous member 40 to support member 24 with freedom to roll over bushings 56,58 and 38. Roll pin 44 includes bolt 60 which has a nut 62 on one end to position tapered washers 64,66 and annular spacers 68,70 and 72.

Figure 3:
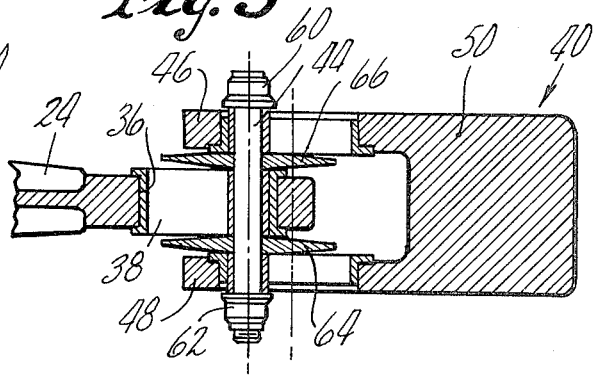
FIG. 3 is a sectional view taken along lines 2—2 showing a bifilar absorber in its operating position.

FIG. 3 shows the bifilar absorber in its operating position when unit 22 is rotating with the rotor about axis 12. In this condition centrifugal force has thrown member 40 outward and member 40 is supported from support member 24 by roll pins 42,44 so that a rolling pendulous and vibration absorbing motion is permitted between weighted member 40 and support member 24.

Tapered, or beveled, washers 64,66 are provided to reduce face-to-face contact between surfaces of side plate 46,48 and confronting surfaces of support member 24 in an effort to reduce the friction at these areas. Otherwise the friction would be so great as to destroy the amplification factor of the absorber and render it almost useless. We have found, however, that even with these washers in place there remains sufficient sliding friction, due to the weight of the pendulous element 40 acting against the hub portions of these washers, to impair the effectiveness of the absorbers.

Figure 4:
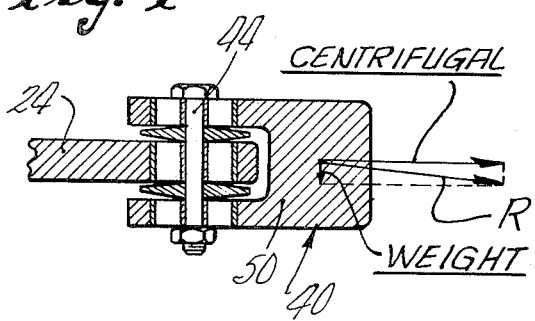
FIGS. 4 and 5 are diagrammatic views illustrating the construction and operation of our improved bifilar absorbers.

By the provisions of this invention all sliding friction in the absorber is virtually eliminated. Referring to FIGS. 4 and 5 which are diagrammatic only it will be seen that, while the central ring 26 of support member 24 lies in a plane normal to axis of rotation 12 of the rotor in both figures, in FIG. 5 star points 28 projecting radially outward beyond ring 26 are inclined downward as will be clear from a comparison of these two figures. FIG. 4 shows the prior art construction in which the star points lie in the plane of ring 26 as in the Paul et al patent No. 3,540,809. FIG. 5 shows, greatly exaggerated, the improved construction of our invention.

It will be noted in FIG. 4 in which one of two roll pin assemblies of an absorber unit 22 is shown, that the weight of bifilar mass 50 rests on the two beveled washers in an area adjacent their hubs. While the bevel of these washers reduced the area of contact it also increased the unit pressure acting on the smaller hub area. Tests indicate that even with the beveled washers there remained sufficient sliding friction in this reduced area to very significantly affect the performance of the bifilar absorbers and that by preventing the weight of the mass 50 from bearing on the washers frictional damping can be virtually eliminated within the absorber.

How this is accomplished very simply is illustrated in FIG. 5 where the bifilar absorber unit 22 has been inclined downward, or drooped, by directing its supporting star point downward relative to its integral central ring 26 to incline the entire absorber 34. To determine the amount of inclination, the weight of mass 50 is calculated to obtain the amplification factor of the absorber desired at a selected r.p.m. of the rotor, usually the cruising speed of the helicopter. With the centrifugal force acting on mass 50 now obtainable, this force C acting normal to axis 12 and force W acting down, the direction and amount of the resultant force R can be determined to get angle $\theta$, which is the angle between force lines C and R, using the formula $$\theta = \tan^{-1} \frac{W}{C}$$

or $$\theta = \tan^{-1} \frac{g}{L\Omega^2}$$

where $W$ is the weight of the pendulous mass 50, $L$ is the distance from the axis of rotor rotation to the c.g. of this mass, $g$ is the acceleration of gravity and $\Omega$ is the rotational speed of the rotor.

As a result of this droop of unit 22 the axes of roll pins 42,44 will lie normal to the resultant force line R and all forces on 22 due to its rotation about rotor axis 12 and the action of gravity will be reacted by roll pins 42,44 and there will be no pressure from 50 pressing against either beveled washer. Since the contact between roll pins 42,44 and the tracking inserts, or bushings, in the two apertures in star point 28 and side plates 46,48 is a rolling contact and the entire force is normal to the tuning pins, the result is no force normal to the beveled washers to create sliding friction. There is, furthermore, no significant increase in Hertz stress on the bifilar bushings.

In the bifilar absorber installation shown the weight of each mass 50 is 25 pounds and the angle of droop $\theta$ is $1° - 26' \pm 8 - 5'$. Due to the small angle of inclination of star points 28 no attempt has been made to show the droop of the bifilar absorbers except in FIGS. 5 and 6 where it is shown somewhat exaggerated for purposes of illustration.

I wish it to be understood that we do not desire to be limitd to the exact details of construction shown and described, since obvious modifications will occur to persons skilled in the art.

We claim:

1. In a helicopter, a rotor drive shaft, a rotor hub on said shaft, a plurality of rotor blades secured to and extending radially from said hub, a plurality of bifilar absorbers rotatable with said hub, a support member for said absorbers including a concentric central ring portion fixed to said hub and rotatable therewith in a plane parallel to the plane of blade rotation, said ring portion having a plurality of star points extending radially therefrom at spaced points about its periphery having end portions deflected downward out of the plane of said ring portion, and an absorber mounted at the extremity of each point.

2. The combination of claim 1 in which each star point of the support member has a plate-like enlargement at its extremity provided with two large apertures and the weight element of the absorber has parallel side arms disposed on opposite sides of said star point provided with similar apertures, and a tuning pin extends through each pair of matching apertures in said star point and said arms, the angle of deflection of the end portions of said star points being such that the resultant of the force due to the weight of said absorber and the centrifugal force of said weight is normal to the axes of said tuning pins.

3. The combination of claim 1 in which the angle of deflection of said end portions from the plane of said ring portion is determined by the equation:

$$\theta = \tan^{-1} \frac{W}{C.F.},$$

where W is the weight of the pendulous element and C.F. is the product of the r.p.m. squared times the distance from the axis of rotor rotation to the c.g. of the pendulous element times the mass of the pendulous element.

4. In a helicopter, a rotor drive shaft, a rotor including a hub carried by said shaft, a plurality of blades projecting radially from said hub, and a support member for a plurality of bifilar absorbers including a central plate carried by said hub and rotatable therewith in a plane parallel with the plane of blade rotation, said plate having a plurality of radially projecting star points symmetrically arranged about the periphery of said plate having end portions deflected downward out of the plane of said plate, said points each having an absorber mounted at its deflected end.

5. In a helicopter, a rotor, a support member for a plurality of bifilar absorbers rotatable therewith in a plane normal to the axis of rotation of said rotor, said members having a plurality of radially extended arms, a bifilar absorber including a pendulous element mounted on each of said arms, and means for minimizing internal frictional damping in said absorbers due to sliding friction between said arms and said pendulous elements comprising absorber attaching portions at the extremeties of said arms which are inclined downward out of the plane of rotation of said support member.

6. In a helicopter, a rotor having a head rotatable about an upstanding axis, a plurality of rotor blades carried by said head, a star support member for a plurality of bifilar vibration absorbers, said member including a central ring portion rotatable with said rotor head in a plane parallel with the plane of rotation of said rotor blades, said member having a plurality of arms spaced about the periphery of said ring portion, each adapted to support an absorber at its extremity, and means for effecting a calculated droop of said bifilar absorbers comprising end portions of said arms which are deflected downward out of the plane of said ring portion.

7. A helicopter rotor having a support member for a plurality of bifilar vibration absorbers comprising a central ring portion carried by said rotor and rotatable in a plane normal to the axis of rotation of said rotor, said ring portion having a plurality of radially projecting arms the extremities of which are deflected downward out of the plane of rotation of said ring portion, each arm having means at its deflected end for supporting a bifilar absorber.

8. A helicopter rotor having a support member for a plurality of bifilar vibration absorbers, said member including a central plate portion secured to the hub of said rotor which lies in a plane normal to the axis of rotation of said rotor, said plate portion having arms arranged about its periphery the end portions of which extend downward out of the plane of rotation of said plate portion, each of said end portions having means at is extremity for supporting the pendulous element of a bifilar absorber.

9. A helicopter rotor having a support member for a plurality of bifilar vibration absorbers, said member consisting of a plate-like portion secured to the hub of said rotor which lies in a plane normal to the axis of rotation of said rotor, said plate-like portion having radially projecting absorber supporting arms arranged about its periphery the end portions of which extend downward from said plate-like portion at an angle $\theta$ to the plane of the latter, where $\theta = \tan^{-1}$ of the weight of the absorber pendulum divided by the centrifugal force acting on said pendulum.

10. A support member for mounting a bifilar vibration absorber on a helicopter rotor head, said member including a central attaching portion rotatable in a plane normal to the axis of rotor rotation and a plurality of absorber supporting portions arranged about the periphery of said attaching portion, each supporting portion including an arm the outer portion of which is deflected downward through angle $\theta$ out of the plane of said attaching portion.

11. The support member of claim 10 in which the attaching portion is a ring and the arms terminate in enlarged plate-like extremities for mounting the pendulous member of a bifilar absorber.

12. The support member of claim 11 in which the angle of deflection $\theta$ of absorber supporting portions of said support member equals $\tan^{-1}$ of the weight of the pendulous element of the absorber divided by the centrifugal force acting on said weight.

13. The support member of claim 11 in which the angle $\theta$ of deflection of the absorber supporting portions of said support member is such that the resultant force of the weight of the pendulous element and the centrifugal force acting on said element lies normal to the tuning pins of the bifilar absorbers.

14. A support member for mounting bifilar vibration absorbers on a helicopter rotor for rotation therewith including a central attaching portion adapted to be attached to the rotor and rotatable therewith in a plane normal to the axis of rotor rotation and a plurality of absorber supporting portions arranged about the periphery of said attaching portion, each supporting portion having means for supporting a bifilar absorber in drooped position and including a radial arm the extremity of which is directed downward out of the plane of rotation of said attaching portion.

15. A support member for mounting a plurality of bifilar absorbers on a helicopter rotor comprising a central portion for attachment to the rotor and a plurality of arms radiating therefrom, each arm having an angularly related absorber mounting end portion.

* * * * *